United States Patent
Yu et al.

(10) Patent No.: US 10,911,093 B2
(45) Date of Patent: Feb. 2, 2021

(54) SIGNAL TRANSMISSION METHOD, SIGNAL RECEIVING METHOD, RELATED DEVICE, AND SYSTEM

(71) Applicant: HUAWEI TECHNOLOGIES CO., LTD., Shenzhen (CN)

(72) Inventors: Yi Yu, Dongguan (CN); Yuanda Huang, Dongguan (CN); Liangchuan Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/564,022

(22) Filed: Sep. 9, 2019

(65) Prior Publication Data

US 2020/0014418 A1   Jan. 9, 2020

Related U.S. Application Data

(63) Continuation of application No. PCT/CN2017/076341, filed on Mar. 10, 2017.

(51) Int. Cl.
*H04B 10/00* (2013.01)
*H04B 1/69* (2011.01)
(Continued)

(52) U.S. Cl.
CPC ............ *H04B 1/69* (2013.01); *H04B 10/541* (2013.01); *H04B 10/6161* (2013.01);
(Continued)

(58) Field of Classification Search
USPC ...................................................... 398/77–78
See application file for complete search history.

(56) References Cited

U.S. PATENT DOCUMENTS 5,103,459 A * 4/1992 Gilhousen ............. H04L 1/0068
370/206
5,936,998 A * 8/1999 Nara ........................ H04B 1/69
375/146
(Continued)

FOREIGN PATENT DOCUMENTS

| CN | 101714907 A | 5/2010 |
| CN | 102413388 A | 4/2012 |

(Continued)

OTHER PUBLICATIONS

Nishihara et al., "Highly Efficient Data Aggregation on Single Optical Carrier through Fiber Frequency Conversion of Discrete Multi-Tone Signal", 2013 Optical Society of America, Mar. 17, 2013, total 3 pages.

*Primary Examiner* — Agustin Bello
(74) *Attorney, Agent, or Firm* — Maier & Maier, PLLC

(57) ABSTRACT

Embodiments described and shown provide a signal transmission method, a signal receiving method, a related device, and a system. The signal transmission method includes: generating a single-wavelength optical carrier; splitting the single-wavelength optical carrier into N subcarriers having a same wavelength; generating a spreading code corresponding to each of the subcarriers to obtain N spreading codes, where a bandwidth of each of the spreading codes is less than or equal to a preset threshold; deserializing a to-be-transmitted data signal into N sub-data signals; modulating the N subcarriers based on the N sub-data signals and the N spreading codes, to obtain N modulation signals; and combining the N modulation signals into one combined signal, and outputting the combined signal.

10 Claims, 9 Drawing Sheets

(51) Int. Cl.
*H04B 10/54* (2013.01)
*H04B 10/61* (2013.01)
*H04J 13/10* (2011.01)
*H04J 14/02* (2006.01)
*H04B 7/0413* (2017.01)

(52) U.S. Cl.
CPC .............. *H04J 13/10* (2013.01); *H04J 14/02* (2013.01); *H04B 7/0413* (2013.01)

(56) References Cited

U.S. PATENT DOCUMENTS

| | | | | |
|---|---|---|---|---|
| 5,966,377 | A * | 10/1999 | Murai | H04B 1/707 370/342 |
| 6,097,714 | A * | 8/2000 | Nagatani | H04B 1/707 370/342 |
| 6,895,037 | B2 * | 5/2005 | Garodnick | H04B 1/707 375/143 |
| 7,574,144 | B2 * | 8/2009 | Galli | H04B 10/505 398/189 |
| 7,983,562 | B1 * | 7/2011 | Yap | H04J 13/0077 370/320 |
| 8,280,248 | B2 * | 10/2012 | Li | H04B 10/0775 398/195 |
| 9,071,340 | B2 * | 6/2015 | Jos | H04B 1/69 |
| 10,374,722 | B2 * | 8/2019 | Huang | H04J 14/005 |
| 2002/0105705 | A1 * | 8/2002 | Turpin | G02B 6/29358 398/141 |
| 2002/0181551 | A1 * | 12/2002 | Lee | H04J 11/0023 375/146 |
| 2003/0011838 | A1 * | 1/2003 | Sasaki | H04J 14/0252 398/43 |
| 2003/0053519 | A1 * | 3/2003 | Gilhousen | H04J 3/02 375/141 |
| 2003/0072051 | A1 * | 4/2003 | Myers | H04J 14/002 398/43 |
| 2004/0208644 | A1 * | 10/2004 | Sirat | H04B 10/506 398/186 |
| 2005/0019040 | A1 * | 1/2005 | Trutna, Jr. | H04B 10/5053 398/183 |
| 2006/0171722 | A1 * | 8/2006 | Toliver | H04B 10/5055 398/188 |
| 2007/0110442 | A1 * | 5/2007 | Peer | H04J 14/005 398/78 |
| 2010/0158527 | A1 * | 6/2010 | Mizutani | H04Q 11/0067 398/78 |
| 2010/0246641 | A1 * | 9/2010 | Li | H04L 27/2626 375/146 |
| 2013/0121706 | A1 | 5/2013 | Yang et al. | |
| 2020/0014418 | A1 * | 1/2020 | Yu | H04B 1/69 |

FOREIGN PATENT DOCUMENTS

| | | |
|---|---|---|
| CN | 102932089 A | 2/2013 |
| CN | 103107851 A | 5/2013 |
| CN | 103179076 A | 6/2013 |
| CN | 105577234 A | 5/2016 |

\* cited by examiner

SIGNAL TRANSMISSION METHOD, SIGNAL RECEIVING METHOD, RELATED DEVICE, AND SYSTEM

CROSS-REFERENCE TO RELATED APPLICATIONS

This application is a continuation of International Application No. PCT/CN2017/076341, filed on Mar. 10, 2017, the disclosure of which is hereby incorporated by reference in its entirety.

FIELD

Embodiments relate to the field of communications technologies, and in particular, to a signal transmission method, a signal receiving method, a related device, and a system.

BACKGROUND

In a signal transmission process, a longer transmission distance usually leads to a larger signal transmission loss. A frequency of a baseband signal transmitted by a transmit end of a transmission system is relatively low, and a spectrum approximately starts from a zero frequency. Therefore, the baseband signal is not proper for long-distance transmission on various channels. To enable the baseband signal to be transmitted for a long distance, corresponding carrier modulation needs to be performed on the baseband signal, to shift a signal spectrum of the baseband signal to a high frequency, so as to modulate the baseband signal into a form in which the baseband signal is proper for long-distance channel transmission.

Quadrature amplitude modulation (QAM) is one carrier modulation scheme that can be used currently. The QAM is a modulation scheme in which amplitude modulation is performed on two quadrature carriers. Phases of two carriers usually differ by 90°. Therefore, the two carriers are referred to as quadrature carriers or quadrature components. The QAM is not only an analog modulation scheme but also a digital modulation scheme. In the QAM, amplitudes of two carries are modulated to transmit two analog message signals or two digital bit streams. In a modulation method of the QAM, amplitude shift keying in the digital modulation scheme or amplitude modulation in the analog modulation scheme is used. In use, two quadrature modulation amplitudes (namely, modulated waves) are added, and a waveform obtained after combination is a combination of phase shift keying and amplitude shift keying, or in an analog case, is a combination of phase modulation and amplitude modulation. Based on this, as an increased transmission capacity is required, signal modulation starts to develop to higher-level QAM, and a signal baud rate of a high-level QAM is increased, so that a bandwidth can be further increased.

It can be noted that a signal with a high baud rate requires support of a high-bandwidth component, and the high-level QAM requires a digital-to-analog converter (DAC) with a large effective number of bits (ENOB). However, because a bandwidth of a current commercial high-speed DAC is limited, and an ENOB of the high-speed DAC at a high frequency is relatively small, signal quality of a generated high-frequency signal is relatively poor. Consequently, a back-to-back bit error rate (BER) of the high-level QAM increases, and system implementation costs increase, resulting in relatively low system reliability of the high-level QAM.

Thus, a bandwidth of a component in a transmission system is a bottleneck of performance of the high-speed high-level QAM. Therefore, when the bandwidth of the component is fixed, a new signal transmission method is desired to improve the performance of the high-level QAM.

SUMMARY

Embodiments provide a signal transmission method, a signal receiving method, a related device, and a system, to resolve a problem of poor high-level QAM performance caused by limitation on a bandwidth of a component in a transmission system.

According to a first aspect, an embodiment provides a signal transmission method that includes:
generating a single-wavelength optical carrier;
splitting the single-wavelength optical carrier into N subcarriers having a same wavelength, where a value of N is a positive integer not less than 2;
generating a spreading code corresponding to each of the subcarriers, to obtain N spreading codes, where a bandwidth of each of the spreading codes is less than or equal to a preset threshold;
deserializing a to-be-transmitted data signal into N sub-data signals, where the N sub-data signals are in a one-to-one correspondence with the N subcarriers;
modulating the N subcarriers based on the N sub-data signals and the N spreading codes, to obtain N modulation signals; and
combining the N modulation signals into one combined signal, and outputting the combined signal.

In this implementation, a signal is transmitted through multiplexing, and the bandwidth of each spreading code is less than or equal to the preset threshold, so that a requirement of each signal on an ENOB can be reduced, and impact caused by quantization noise of a DAC and electrical noise of another electronic component can be effectively reduced, thereby improving performance of high-level QAM.

With reference to the first aspect, in a first possible implementation of the first aspect, the generating a spreading code corresponding to each of the subcarriers, to obtain N spreading codes includes:
when a code type of a spreading code corresponding to an $n^{th}$ subcarrier is different from a code type of a spreading code of an $(n+1)^{th}$ subcarrier, triggering an $m^{th}$ spreading code generator to generate the spreading code corresponding to the $n^{th}$ subcarrier, and triggering an $(m+1)^{th}$ spreading code generator to generate the spreading code corresponding to the $(n+1)^{th}$ subcarrier, where n is a positive integer less than or equal to N−1, and m is a positive integer less than or equal to N−1.

With reference to the first aspect, in a second possible implementation of the first aspect, the generating a spreading code corresponding to each of the subcarriers, to obtain N spreading codes includes:
when a code type of a spreading code corresponding to an $n^{th}$ subcarrier is the same as a code type of a spreading code of an $(n+1)^{th}$ subcarrier, triggering an $m^{th}$ spreading code generator to generate the spreading code corresponding to the $n^{th}$ subcarrier, and delaying, for t bits, the spreading code corresponding to the $n^{th}$ subcarrier, to obtain the spreading code of the $(n+1)^{th}$ subcarrier, where n is a positive integer less than or equal to N−1, and m is a positive integer less than N−1.

In this implementation, when the code types of the two spreading codes are the same, the two spreading codes are generated by using one spreading code generator, so that a device can be simplified, costs can be reduced, and impact of the spreading code generator on QAM performance can be reduced when signal transmission is normally performed.

With reference to the first aspect, in a third possible implementation of the first aspect, the modulating the N subcarriers based on the N sub-data signals and the N spreading codes, to obtain N modulation signals includes:

when all bits of a spreading code corresponding to the subcarrier are the same, performing data modulation on the subcarrier based on a sub-data signal corresponding to the subcarrier, to obtain a modulation signal; or when not all bits of a spreading code corresponding to the subcarrier are the same, performing data modulation and spread spectrum modulation on the subcarrier based on the spreading code and a sub-data signal corresponding to the subcarrier, to obtain a modulation signal.

In this implementation, because a spectrum spreading effect cannot be achieved when all the bits of the spreading code corresponding to the subcarrier are the same, spread spectrum modulation is not performed in a modulation process corresponding to the spreading code. Therefore, from a perspective of a device, a spread spectrum modulator does not need to be disposed, so that the device can be simplified and costs can be reduced from another perspective.

With reference to the first aspect, in a fourth possible implementation of the first aspect, the performing data modulation and spread spectrum modulation on the subcarrier based on the spreading code and a sub-data signal corresponding to the subcarrier, to obtain a modulation signal includes:

performing data modulation on the subcarrier based on the sub-data signal, to obtain a data modulation signal; and performing spread spectrum modulation on the data modulation signal based on the spreading code, to obtain the modulation signal; or performing spread spectrum modulation on the subcarrier based on the spreading code, to obtain a spread spectrum signal; and performing data modulation on the spread spectrum signal based on the sub-data signal, to obtain the modulation signal.

According to a second aspect, an embodiment further provides a signal receiving method, and the method includes: receiving a signal transmitted by a signal transmission device, where the signal is obtained by the signal transmission device after the signal transmission device splits the single-wavelength optical carrier into N subcarriers having a same wavelength, generates a spreading code corresponding to each of the subcarriers to obtain N spreading codes, modulates the N subcarriers based on N sub-data signals and the N spreading codes to obtain N modulation signals, and combines the N modulation signals;

performing optical-to-electrical conversion and analog-to-digital conversion processing on the received signal, to obtain a digital signal;

despreading the digital signal based on the N spreading codes, to obtain N despread signals; and performing low-pass filtering on each of the N despread signals, to obtain N data signals, where N is a positive integer not less than 2.

With reference to the second aspect, in a first possible implementation of the second aspect, the method further includes:

performing adaptive filtering on each of the N data signals, to obtain N data signals obtained after the adaptive filtering.

With reference to the second aspect, in a second possible implementation of the second aspect, the method further includes:

performing carrier delay restoration on each of the N data signals obtained after the adaptive filtering, to obtain N data signals obtained after the carrier delay restoration.

With reference to the second aspect, in a third possible implementation of the second aspect, before the despreading the digital signal, the method further includes:

performing dispersion compensation on the digital signal.

In this implementation, the received signal is first despread to obtain the N spreading codes, and then processing such as adaptive filtering, delay restoration, and dispersion compensation is performed on the N spreading codes, so that accuracy of data restoration and receiving can be improved.

According to a third aspect, an embodiment further provides a signal transmission device, including a light source, a deserializer, a first splitter, a combiner, M spreading code generators, and N modulators, where a value of N is a positive integer not less than 2, and M is a positive integer less than or equal to N, where the light source is configured to: generate a single-wavelength optical carrier, and output the single-wavelength optical carrier to the first splitter;

the deserializer is configured to: deserialize a to-be-transmitted data signal into N sub-data signals, and output the N sub-data signals to the N modulators, where the N sub-data signals are in a one-to-one correspondence with the N modulators;

the first splitter is configured to: split the single-wavelength optical carrier generated by the light source into N subcarriers having a same wavelength, and output the N subcarriers to the N modulators, where the N subcarriers are in a one-to-one correspondence with the N modulators;

the spreading code generator is configured to generate a spreading code corresponding to each subcarrier obtained by the first splitter through the splitting, to obtain N spreading codes, where a bandwidth of a spreading code generated by each of the spreading code generators is less than or equal to a preset threshold;

the modulator is configured to: modulate, based on a sub-data signal corresponding to the modulator, and a spreading code in the N spreading codes that corresponds to the modulator, a subcarrier corresponding to the modulator, to obtain a modulation signal corresponding to the modulator, and output the modulation signal to the combiner; and the combiner is configured to: combine N modulation signals received from the N modulators into one combined signal, and output the combined signal.

With reference to the third aspect, in a first possible implementation of the third aspect, when a code type of a spreading code corresponding to an $n^{th}$ subcarrier is different from a code type of a spreading code of an $(n+1)^{th}$ subcarrier, an $m^{th}$ spreading code generator in the M spreading code generators generates an $n^{th}$ spreading code, and inputs the $n^{th}$ spreading code to an $n^{th}$ modulator to which the $n^{th}$ subcarrier is correspondingly input; and an $(m+1)^{th}$ spreading code generator in the M spreading code generators generates an $(n+1)^{th}$ spreading code, and inputs the $(n+1)^{th}$ spreading code to an $(n+1)^{th}$ modulator to which the $(n+1)^{th}$ subcarrier is correspondingly input, where n is a positive integer less than or equal to N−1, and m is a positive integer less than or equal to M−1.

With reference to the third aspect, in a second possible implementation of the third aspect, when a code type of a spreading code corresponding to an $n^{th}$ subcarrier is the same as a code type of a spreading code of an $(n+1)^{th}$ subcarrier, an $m^{th}$ spreading code generator in the M spreading code generators generates a spreading code, and inputs the spreading code to a second splitter;

the second splitter is configured to split the spreading code into two spreading codes, where one spreading code is used as an $n^{th}$ spreading code, and is input to an $n^{th}$ modulator to which the $n^{th}$ subcarrier is correspondingly input, and the other spreading code is input to a delayer; and the delayer is configured to: delay, for t bits, the spreading code that is input by the second splitter and that is obtained after the splitting, to obtain an $(n+1)^{th}$ spreading code, and input the $(n+1)^{th}$ spreading code to an $(n+1)^{th}$ modulator to which the $(n+1)^{th}$ subcarrier is correspondingly input, where n is a positive integer less than or equal to N−1, and m is a positive integer less than or equal to M−1.

With reference to the third aspect, in a third possible implementation of the third aspect, the modulators include:

a modulator receiving a spreading code whose bits are all the same, configured to: perform, based on a sub-data signal corresponding to the modulator, data modulation on a subcarrier corresponding to the modulator, to obtain a modulation signal, and output the modulation signal to the combiner; or a modulator receiving a spreading code whose bits are not all the same, configured to: perform, based on the spreading code and a sub-data signal that correspond to the modulator, data modulation and spread spectrum modulation on a subcarrier corresponding to the modulator, to obtain a modulation signal, and output the modulation signal to the combiner.

With reference to the third aspect, in a fourth possible implementation of the third aspect, that a modulator performs, based on the spreading code and a sub-data signal that correspond to the modulator, data modulation and spread spectrum modulation on a subcarrier corresponding to the modulator, to obtain a modulation signal includes:

performing, by a data modulator in the modulator based on the sub-data signal corresponding to the modulator, data modulation on the subcarrier corresponding to the modulator, to obtain a data modulation signal, and outputting the data modulation signal to a spread spectrum modulator in the modulator; and performing, by the spread spectrum modulator, spread spectrum modulation on the data modulation signal based on the spreading code corresponding to the modulator, to obtain the modulation signal; or performing, by the spread spectrum modulator based on the spreading code corresponding to the modulator, spread spectrum modulation on the subcarrier corresponding to the modulator, to obtain a spread spectrum modulation signal, and outputting the spread spectrum modulation signal to the data modulator; and performing, by the data modulator, data modulation on the spread spectrum modulation signal based on the sub-data signal corresponding to the modulator, to obtain the modulation signal.

According to a fourth aspect, an embodiment further provides a signal receiving device, including an optical-to-electrical converter OEC, an analog-to-digital converter ADC, and a digital signal processor DSP, where the OEC is configured to: receive a signal transmitted by a signal transmission device, convert the received signal into an electrical signal, and output the electrical signal to the ADC, where the signal is obtained by the signal transmission device after the signal transmission device splits, by using a splitter, a single-wavelength optical carrier generated by a light source into N subcarriers having a same wavelength, generates a spreading code corresponding to each of the subcarriers to obtain N spreading codes, modulates the N subcarriers based on N sub-data signals and the N spreading codes to obtain N modulation signals, and combines the N modulation signals;

the ADC is configured to: receive the electrical signal output by the OEC, convert the electrical signal into a digital signal, and output the digital signal to the DSP; and the DSP is configured to: receive the digital signal output by the ADC, despread the digital signal based on the N spreading codes to obtain N despread signals, and perform low-pass filtering on each of the N despread signals to obtain N data signals, where N is a positive integer not less than 2.

With reference to the fourth aspect, in a first possible implementation of the fourth aspect, the DSP further includes a multiple-input multiple-output filter, where the multiple-input multiple-output filter is configured to perform adaptive filtering on each of the N data signals, to obtain N data signals obtained after the adaptive filtering.

With reference to the fourth aspect, in a second possible implementation of the fourth aspect, the DSP further includes N delay restorers that are in a one-to-one correspondence with the N data signals obtained after the adaptive filtering, where each of the N delay restorers is configured to perform carrier delay restoration on a data signal that exists after the adaptive filtering and that corresponds to the delay restorer, to obtain a data signal obtained after the carrier delay restoration.

With reference to the fourth aspect, in a third possible implementation of the fourth aspect, the DSP further includes a dispersion compensator, where the dispersion compensator is configured to: before the received digital signal is despread, perform dispersion compensation on the received digital signal, and output a digital signal obtained after the dispersion compensation to the N despreaders.

According to a fifth aspect, an embodiment further provides a signal transmission system, including a signal transmission device and a signal receiving device, where the signal transmission device is configured to: generate a single-wavelength optical carrier; split the single-wavelength optical carrier into N subcarriers having a same wavelength; generate a spreading code corresponding to each of the subcarriers, to obtain N spreading codes, where a bandwidth of each of the spreading codes is less than or equal to a preset threshold; deserialize a to-be-transmitted data signal into N sub-data signals; modulate the N subcarriers based on the N sub-data signals and the N spreading codes, to obtain N modulation signals; and combine the N modulation signals into one combined signal, and output the combined signal, where a value of N is a positive integer not less than 2, and the N sub-data signals are in a one-to-one correspondence with the N subcarriers; and the signal receiving device is configured to: receive the signal transmitted by the signal transmission device; perform optical-to-electrical conversion and analog-to-digital conversion processing on the received signal, to obtain a digital signal; despread the digital signal based on the N spreading codes, to obtain N despread signals; and perform low-pass filtering on each of the N despread signals, to obtain N data signals.

According to the signal transmission method, the signal receiving method, the related device, and the system in the embodiments, the generated single-wavelength optical carrier is split into the N subcarriers having the same wavelength, the spreading code corresponding to each of the subcarriers is generated to obtain the N spreading codes, the to-be-transmitted data signal is deserialized to obtain the N sub-data signals, the N subcarriers are modulated based on the N spreading codes and the N sub-data signals to obtain the N modulation signals, and then the N modulation signals are combined and output. It can be understood that, because a baud rate of each data signal can be reduced through multiplexing, when a bandwidth of a DAC and a bandwidth of another electronic component are fixed, a requirement of each signal on an ENOB can be reduced, so that impact caused by quantization noise of the DAC and electrical noise of the another electronic component can be effectively reduced, thereby improving performance of high-level QAM.

BRIEF DESCRIPTION OF THE DRAWINGS

To describe the technical solutions in the embodiments more clearly, the following briefly describes accompanying drawings in the embodiments. Persons of ordinary skill in the art may still derive other accompanying drawings from these accompanying drawings without creative efforts.

DETAILED DESCRIPTION OF EMBODIMENTS

The following describes the embodiments with reference to accompanying drawings.

Figure 1:
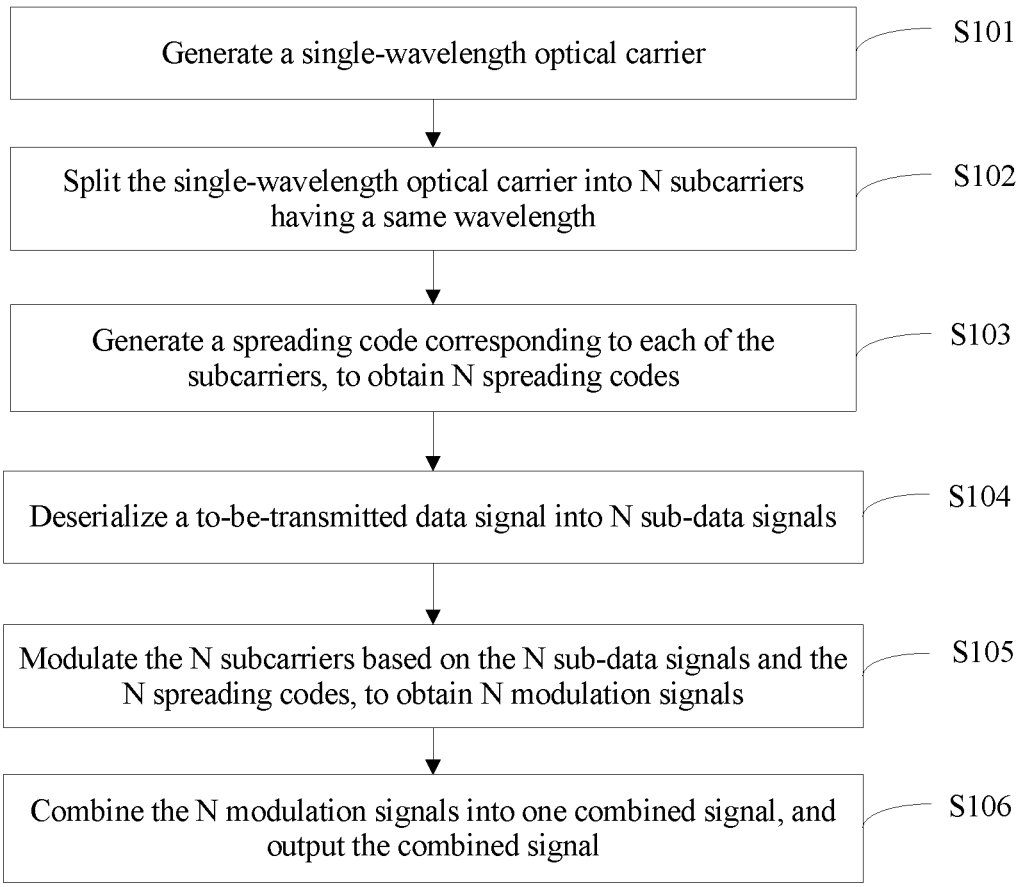
FIG. 1 is a method flowchart of a signal transmission method according to an embodiment.

To resolve a prior-art problem of poor high-level QAM performance caused by limitation on a bandwidth of a component, embodiment 1 provides a signal transmission method. In this exemplary embodiment, FIG. 1 is a method flowchart of the signal transmission method according to this embodiment. The signal transmission method may include the following steps:

In step S101: generate a single-wavelength optical carrier.

In step S102: split the single-wavelength optical carrier into N subcarriers having a same wavelength.

In step S103: generate a spreading code corresponding to each of the subcarriers, to obtain N spreading codes.

In step S104: deserialize a to-be-transmitted data signal into N sub-data signals.

In step S105: modulate the N subcarriers based on the N sub-data signals and the N spreading codes, to obtain N modulation signals.

In step S106: combine the N modulation signals into one combined signal, and output the combined signal.

In other words, in a signal transmission device that performs the method in this embodiment, after a light source generates the single-wavelength optical carrier, any splitter such as a coupler splits the single-wavelength optical carrier to obtain the N subcarriers having the same wavelength, where N is a positive integer not less than 2. Then, M spreading code generators each generate the spreading code corresponding to each subcarrier, to obtain the N spreading codes, where M is a positive integer less than or equal to N. In addition, in a process of performing the foregoing actions, a deserializer in the signal transmission device further deserializes the received to-be-transmitted data signal to obtain the N sub-data signals, and the N sub-data signals are in a one-to-one correspondence with the N subcarriers. Further, modulators corresponding to all the subcarriers modulate the N subcarriers based on the N sub-data signals and the N spreading codes, to obtain the N modulation signals. Then, a combiner combines the N modulation signals into the combined signal, and outputs the combined signal to a signal receiving device. It can be understood that, because a baud rate of each data signal can be reduced through multiplexing, when a bandwidth of a DAC and a bandwidth of another electronic component are fixed, a requirement of each signal on an ENOB can be reduced, so that impact of quantization noise of the DAC and electrical noise of the another electronic component can be effectively reduced, thereby improving performance of high-level QAM.

It can be noted that, in this embodiment, the to-be-transmitted signal is any data signal that can be transmitted by using an optical fiber system. Because performance of each component of the signal transmission device is fixed, a total rate of data signals that can be transmitted by the signal transmission device is also fixed. Based on this, after the to-be-transmitted data signal is split into the N sub-data signals, a transmission rate of each sub-data signal decreases relative to that existing before the splitting.

The splitter corresponds to the N subcarriers. In an optional embodiment, N spreading code generators may be separately disposed in the signal transmission device to generate the N spreading codes. A spreading code is generated by a spreading code generator based on a preset code type, the code type is determined based on a bit length used by the signal transmission device, and bandwidths of spreading codes of different code types are different. Therefore, it can be understood that not all bandwidths of the N spreading codes are consistent, bandwidths of some spreading codes are relatively large, and bandwidths of the other spreading codes are relatively small. A smaller bandwidth of a spreading code leads to a lower generation rate of the spreading code. In view of this, to further optimize this solution to reduce impact of the spreading code generator on system performance, in this embodiment, the code type of the spreading code may be set according to a preset rule, so that a bandwidth of each spreading code is less than or equal to a preset threshold. Additionally, in this embodiment, the preset threshold may be set based on a requirement, for example, may be set to half of a maximum bandwidth of a spreading code of the signal transmission device.

For example, in an optional embodiment, a Walsh spreading code with a 4-bit length is used. It is assumed that the maximum bandwidth of the spreading code of the signal transmission device is v. If the spreading code is 1 1 1 1, a bandwidth of the spreading code is 0. If the spreading code is 1 −1 −1 1, a bandwidth of the spreading code is v/4. If the spreading code is 1 −1 1 −1, a bandwidth of the spreading code is v/2. Based on this, it can be understood that a spreading code generator generating the spreading code 1 −1 1 −1 has a relatively high generation rate. Therefore, a requirement on a component is relatively high. To optimize this solution, code types of the spreading codes may be preset to 1 1 1 1, 1 −1 −1 1, and −1 −1 1 1.

In addition, it can be noted that spread spectrum modulation is a modulation method in which a spread spectrum modulator modulates an amplitude and a phase of a corresponding subcarrier based on a spreading code, so as to widen a spectrum of the subcarrier. Therefore, when all bits of the spreading code are the same, the spreading code has no impact on the amplitude and the phase of the subcarrier. In this case, the corresponding spread spectrum modulator cannot play, based on the spreading code, a role in spread spectrum modulation on the subcarrier corresponding to the spreading code. Based on this, to reduce components of the signal transmission device, in this embodiment, optionally, the modulating the N subcarriers based on the N sub-data signals and the N spreading codes may be performed as follows:

When all bits of a spreading code corresponding to the subcarrier are the same, it indicates that the spreading code is not playing a role in spread spectrum modulation on the subcarrier. Therefore, a modulator in the signal transmission device may be configured to perform data modulation on the subcarrier based on a sub-data signal corresponding to the subcarrier, to obtain a modulation signal. Correspondingly, when not all bits of a spreading code corresponding to the subcarrier are the same, it indicates that the spreading code can play a role in spread spectrum modulation on the subcarrier. Therefore, a corresponding modulator in the signal transmission device is configured to perform data modulation and spread spectrum modulation on the subcarrier based on the spreading code and a sub-data signal corresponding to the subcarrier, to obtain a modulation signal.

Based on the foregoing description, the performing of data modulation and spread spectrum modulation on the subcarrier based on the spreading code and a sub-data signal corresponding to the subcarrier may be performed as follows:

A data modulator in a corresponding modulator is first configured to: perform data modulation on the corresponding subcarrier based on the sub-data signal to obtain a data modulation signal, and input the data modulation signal to a spread spectrum modulator in the corresponding modulator. Then, the spread spectrum modulator performs spread spectrum modulation on the data modulation signal based on the corresponding spreading code. Alternatively, the spread spectrum modulator is first configured to: perform spread spectrum modulation on the corresponding subcarrier based on the spreading code to obtain a spread spectrum signal, and input the spread spectrum signal to the data modulator. Then, the data modulator performs data modulation on the spread spectrum signal based on the sub-data signal.

In other words, for each of the N subcarriers, a sequence of data modulation and spread spectrum modulation may be flexibly changed. For example, data modulation may be first performed on the subcarrier, and then spread spectrum modulation is performed. Alternatively, spread spectrum modulation may be first performed on the subcarrier, and then data modulation is performed. This is not limited in this embodiment.

In addition, data modulation and spectrum spreading may be performed on any subcarrier that is used as a whole, to obtain a spread spectrum modulation signal. Alternatively, a subcarrier may be split into two tributary subcarriers for each of which data modulation and spectrum spreading are performed, to obtain two tributary spread spectrum modulation signals, and the two tributary spread spectrum modulation signals are combined and output, to obtain a spread spectrum modulation signal corresponding to the subcarrier. This is a technology well known to persons of ordinary skill in the art. Details are not described herein in this embodiment.

Based on the foregoing implementation process, after modulating the N sub-data signals, the N subcarriers, and the N spreading codes to obtain the N modulation signals, the signal transmission device further combines the N modulation signals to obtain the combined signal, and outputs the combined signal to the signal receiving device, so that the signal receiving device demodulates the combined signal to finally obtain the to-be-transmitted data signal. An execution process of the signal receiving device is described in detail below. Details are not described herein in this embodiment.

It can be understood from the description in Embodiment 1 that, in the technical solutions in this embodiment, because a baud rate of each data signal can be reduced through multiplexing, when a bandwidth of a DAC and a bandwidth of another electronic component are fixed, a requirement of each signal on an ENOB can be reduced, so that impact caused by quantization noise of the DAC and electrical noise of the another electronic component can be effectively reduced, thereby improving performance of high-level QAM.

It can be understood from the description in embodiment 1 above that the code type of the spreading code is set according to the preset rule. Therefore, when the preset rule is met, code types of any two spreading codes may be the same or different. In addition, when the code types of the two spreading codes are the same, bit delays of the two spreading codes are different. In view of this, to reduce costs and simplify a structure of the signal transmission device, in embodiment 2, spreading codes of a same code type may be generated by using a same spreading code generator.

For example, when a code type of a spreading code corresponding to an $n^{th}$ subcarrier is different from a code type of a spreading code of an $(n+1)^{th}$ subcarrier, an $m^{th}$ spreading code generator may be configured to generate the spreading code corresponding to the $n^{th}$ subcarrier, and an $(m+1)^{th}$ spreading code generator is configured to generate the spreading code corresponding to the $(n+1)^{th}$ subcarrier. In other words, the two spreading code generators are configured to respectively generate the two spreading codes. However, when a code type of a spreading code corresponding to an $n^{th}$ subcarrier is the same as a code type of a spreading code of an $(n+1)^{th}$ subcarrier, an $m^{th}$ spreading code generator may be configured to generate the spreading code corresponding to the $n^{th}$ subcarrier, the spreading code corresponding to the $n^{th}$ subcarrier is delayed for t bits, and a spreading code obtained after the delaying is used as the spreading code of the $(n+1)^{th}$ subcarrier.

It can be noted that, in this embodiment, n is a positive integer less than or equal to N−1, m is a positive integer less than N−1, and t may be set based on a bit delay between the two spreading codes. This is not limited in this embodiment.

For example, in an optional embodiment, a Walsh spreading code with a 4-bit length is used, a first spreading code is 1 1 1 1, and a second spreading code is 1 −1 −1 1. In this case, a code type of the first spreading code is different from a code type of the second spreading code. Therefore, a first spreading code generator is configured to generate the first spreading code, and a second spreading code generator is configured to generate the second spreading code. However, if a first spreading code is −1 1 1 −1, and a second spreading code is 1 −1 −1 1, the two spreading codes have a same code type, and differ by 1 bit. Therefore, a first spreading code generator may be configured to generate the first spreading code −1 1 1 −1, and the first spreading code −1 1 1 −1 is delayed for 1 bit, to obtain the second spreading code 1 −1 −1 1.

It should be understood that the foregoing is only an optional example. When a Walsh spreading code with an 8-bit length is used, a first spreading code is 1 1 1 1 −1 −1 −1 −1, and a second spreading code is 1 1 −1 −1 −1 −1 1 1, the two spreading codes have a same code type, and differ by 2 bits. Therefore, when the first spreading code is generated, the first spreading code is delayed for 2 bits to obtain a second spreading code.

In addition, it can be noted that, when the code type of the spreading code corresponding to the $n^{th}$ subcarrier is the same as the code type of the spreading code of the $(n+1)^{th}$ subcarrier, in a process of modulating the two subcarriers, in an optional embodiment, the spreading code generated by the $m^{th}$ spreading code generator may be first split, and spread spectrum modulation is performed on the $n^{th}$ subcarrier based on one of spreading codes obtained after the splitting, to obtain a spread spectrum modulation signal. Further, data modulation is performed on the corresponding spread spectrum modulation signal based on a sub-data signal corresponding to the $n^{th}$ subcarrier. After the other spreading code is delayed for t bits, spread spectrum modulation is performed on the $(n+1)^{th}$ subcarrier based on a spreading code obtained after the delaying, to obtain a spread spectrum modulation signal. Then, data modulation is performed on the spread spectrum modulation signal based on a sub-data signal corresponding to the $(n+1)^{th}$ subcarrier.

Alternatively, in another optional embodiment, spread spectrum modulation may be performed on the subcarrier based on the spreading code generated by the $m^{th}$ spreading code generator, to obtain a spread spectrum modulation signal. Then, the spread spectrum modulation signal is split into two spread spectrum modulation signals. Based on a sub-data signal corresponding to the $n^{th}$ subcarrier, data modulation is performed on one of the spread spectrum modulation signals, and the other spread spectrum modulation signal is delayed for t bits. Then, data modulation is performed, based on a sub-data signal corresponding to the $(n+1)^{th}$ subcarrier, on a spread spectrum modulation signal obtained after the delaying.

Alternatively, in a third optional embodiment, data modulation is first performed on the $n^{th}$ subcarrier and the $(n+1)^{th}$ subcarrier, to obtain an $n^{th}$ data modulation signal and an $(n+1)^{th}$ data modulation signal. Then, spread spectrum modulation is performed on the $n^{th}$ data modulation signal based on one of spreading codes generated by the $m^{th}$ spreading code generator, and spread spectrum modulation is performed on the $(n+1)^{th}$ data modulation signal based on a spreading code obtained after the foregoing spreading code is delayed for t bits.

The foregoing is merely optional implementations provided in the invention. This is not limited in this embodiment.

It can be understood that, based on the implementation method of respectively disposing the N spreading code generators to generate the N spreading codes in embodiment 1, a device can be simplified and costs can be reduced in embodiment 2 when signal transmission is normally performed.

Figure 2:
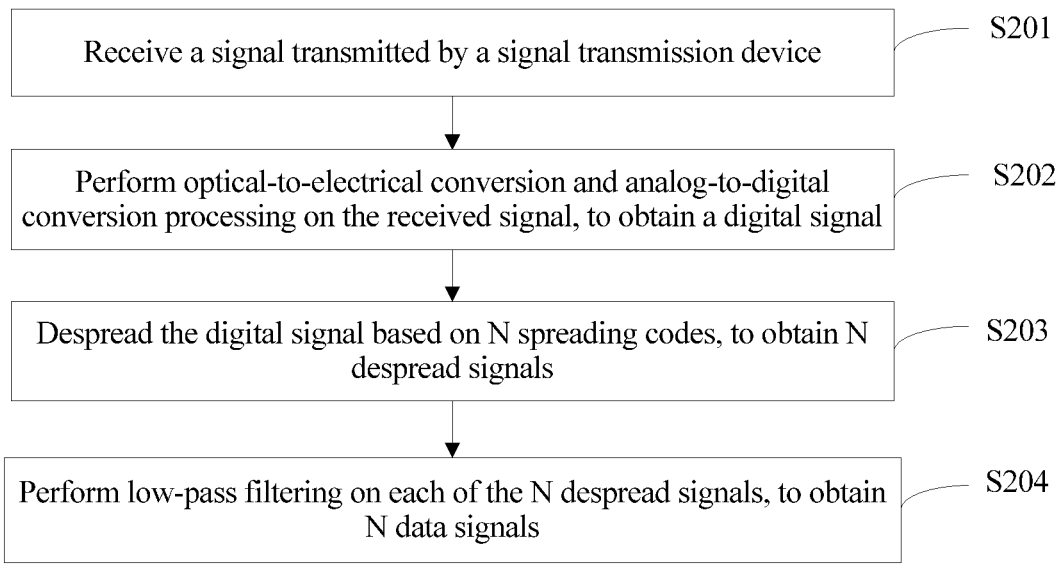
FIG. 2 is a method flowchart of a signal receiving method according to an embodiment.

Corresponding to the signal transmission method in embodiment 1 and embodiment 2, embodiment 3 provides a signal receiving method. FIG. 2 is a method flowchart of the signal receiving method according to this embodiment. The signal receiving method includes the following steps:

In step S201: receive a signal transmitted by a signal transmission device.

In step S202: perform optical-to-electrical conversion and analog-to-digital conversion processing on the received signal, to obtain a digital signal.

In step S203: despread the digital signal based on N spreading codes, to obtain N despread signals.

In step S204: perform low-pass filtering on each of the N despread signals, to obtain N data signals.

In other words, after performing optical-to-electrical conversion on the received signal by using an optical-to-electrical converter, and performing analog-to-digital conversion processing by using an analog-to-digital converter, to obtain the digital signal, a signal receiving device may despread the digital signal based on the N spreading codes used by the signal transmission device for spread spectrum modulation, so as to improve accuracy of data restoration and receiving.

It can be noted that, in this embodiment, the signal transmitted by the signal transmission device is obtained after the signal transmission device splits the single-wavelength optical carrier into N subcarriers having a same wavelength, generates a spreading code corresponding to each of the subcarriers to obtain the N spreading codes, modulates the N subcarriers based on N sub-data signals and the N spreading codes to obtain N modulation signals, and combines the N modulation signals. Therefore, the signal receiving device receives the signal from a combiner in the signal transmission device. For an implementation process in which the signal transmission device generates the signal, the descriptions in embodiment 1 and embodiment 2 may be referred to for details. Details are not described again in this embodiment.

Optionally, a digital signal processor may despread the signal by multiplying each of the N spreading codes by the digital signal, to obtain the N despread signals. Details are not described herein.

It can be noted that the N spreading codes may be mutually-orthogonal bipolar binary spread spectrum sequences.

For example, each of the N spreading codes may be a real number sequence, such as a Walsh code or an OVSF code. To obtain spectrums that are more evenly-distributed, each spreading code may alternatively be a sequence code or the like generated by scrambling a real number sequence such as a Walsh code or an OVSF code based on a specified pseudo-random sequence code. This is not limited in this embodiment.

Further, orthogonality between spreading codes may be damaged due to dispersion of a fiber link, polarization mode dispersion (PMD), state of polarization (SOP) rotation, nonlinearity, and the like. Consequently, multi-access crosstalk and the like are caused. Therefore, the method may further include:

performing, by a low-pass filter disposed in the signal receiving device, adaptive filtering on each of the N data signals, to obtain N data signals obtained after the adaptive filtering, so as to improve accuracy of data restoration and receiving.

Further, the method may include:

respectively performing, by N delay restorers, carrier delay restoration on the N data signals obtained after the adaptive filtering, to obtain N data signals obtained after the carrier delay restoration, so as to further improve accuracy of data restoration and receiving.

Further, before the despreading the digital signal, the method may include:

performing dispersion compensation on the digital signal by using a dispersion compensator, to eliminate impact of dispersion on the digital signal, so as to further improve accuracy of data restoration and receiving.

Additionally, it can be noted that the signal receiving method in embodiment 3 may be performed by a signal receiving device such as an optical receiver. Details are not described in this embodiment.

Embodiment 4

Figure 3:
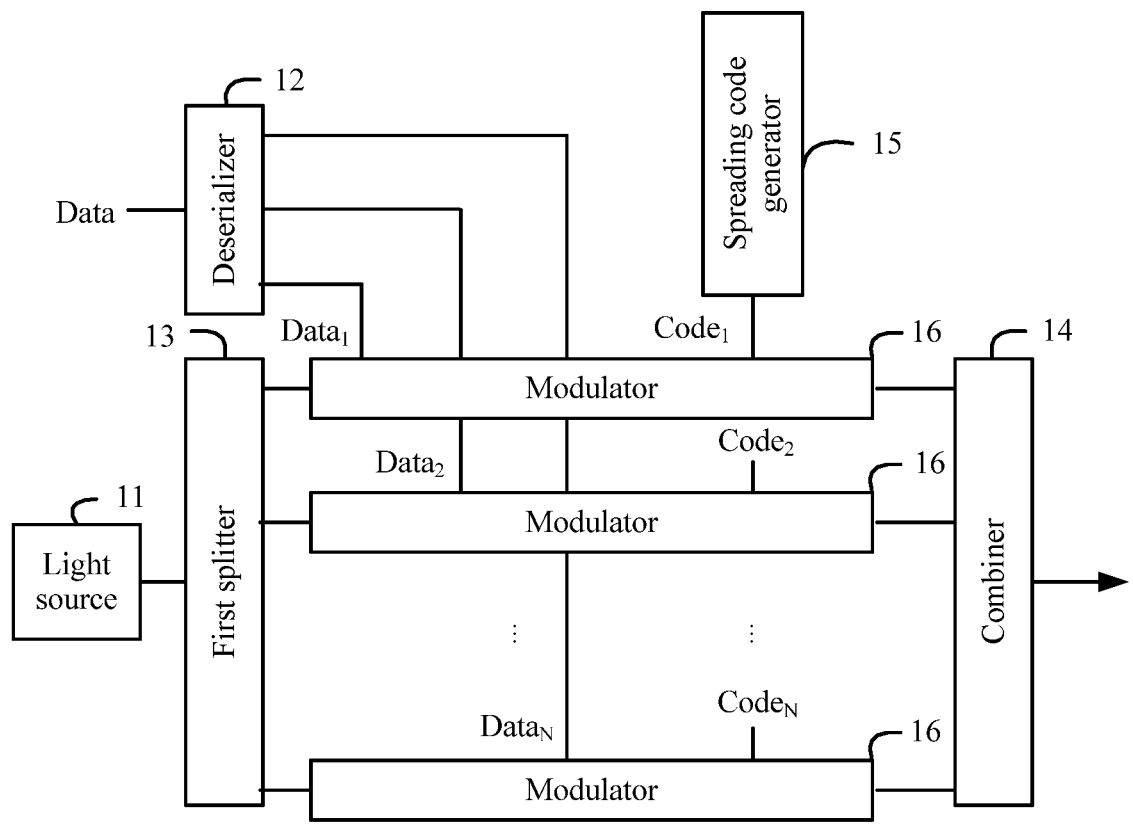
FIG. 3 is a schematic structural diagram of a signal transmission device according to an embodiment.

Corresponding to the signal transmission method in embodiment 1, embodiment 4 further provides a signal transmission device. FIG. 3 is a schematic structural diagram of the signal transmission device according to this embodiment. As shown in FIG. 3, the signal transmission device includes a light source 11, a deserializer 12, a first splitter 13, a combiner 14, M spreading code generators 15, and N modulators 16.

The light source 11 is configured to: generate a single-wavelength optical carrier, and output the single-wavelength optical carrier to the first splitter 13.

The deserializer 12 is configured to: deserialize a to-be-transmitted data signal into N sub-data signals, and output the N sub-data signals to the N modulators 16, where the N sub-data signals are in a one-to-one correspondence with the N modulators 16.

The first splitter 13 is configured to: split the single-wavelength optical carrier generated by the light source 11 into N subcarriers having a same wavelength, and output the N subcarriers to the N modulators 16, where the N subcarriers are in a one-to-one correspondence with the N modulators 16.

The spreading code generator 15 is configured to generate a spreading code corresponding to each subcarrier obtained by the first splitter 13 through the splitting, to obtain N spreading codes.

The modulator 16 is configured to: modulate, based on a sub-data signal corresponding to the modulator 16, and a spreading code in the N spreading codes that corresponds to the modulator 16, a subcarrier corresponding to the modulator 16, to obtain a modulation signal corresponding to the modulator 16, and output the modulation signal to the combiner 14.

The combiner 14 is configured to: combine N modulation signals received from the N modulators 16 into one combined signal, and output the combined signal.

It can be noted that, in this embodiment, a value of N is a positive integer not less than 2, and M is a positive integer less than or equal to N. In addition, the to-be-transmitted data signal is received by the signal transmission device from any user equipment connected to the signal transmission device, and the to-be-transmitted data signal is any digital signal that can be transmitted by using an optical fiber transmission system.

For example, the light source 11 may be any light source that can generate a single-wavelength optical carrier, for example, a single-wavelength laser light source. The first splitter 13 may be any splitting device that can split a single-wavelength optical carrier into a number of subcarriers having a same wavelength, for example, a coupler. The combiner 14 may be any combination device that can combine N spread spectrum modulation signals into one spread spectrum modulation signal, for example, a coupler. This is not limited in this embodiment.

In addition, it can be understood from the description in embodiment 1 that all bandwidths of the N spreading codes are less than or equal to a preset threshold. Therefore, correspondingly, in this embodiment, a bandwidth of a spreading code generated by each of the M spreading code generators 15 is less than or equal to the preset threshold. In this embodiment, the preset threshold may be half of a maximum bandwidth of a spreading code.

Figure 4:
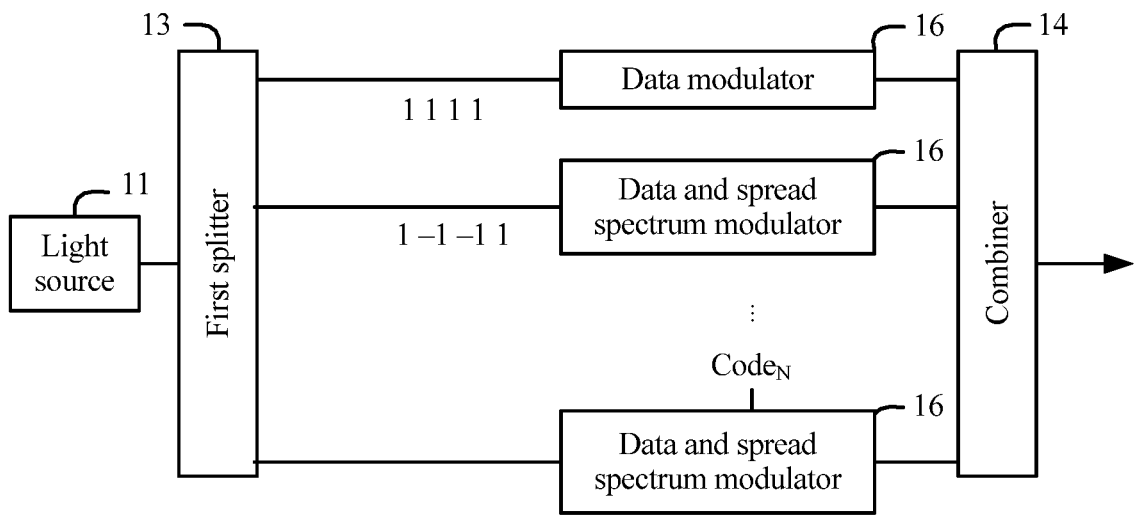
FIG. 4 is a schematic structural diagram of an implementation of a signal transmission device according to an embodiment.

Optionally, FIG. 4 is a schematic structural diagram of an implementation of the signal transmission device according to this embodiment. Corresponding to the process of generating the modulation signal in embodiment 1, in the signal transmission device shown in FIG. 4, the modulators 16 include:

a modulator receiving a spreading code whose bits are all the same, configured to: perform, based on a sub-data signal corresponding to the modulator 16, data modulation on a subcarrier corresponding to the modulator 16, to obtain a modulation signal, and output the modulation signal to the combiner 14, where as shown in FIG. 4, the spreading code received by the modulator is 1 1 1 1; or a modulator receiving a spreading code whose bits are not all the same, configured to: perform, based on the spreading code and a sub-data signal that correspond to the modulator, data modulation and spread spectrum modulation on a subcarrier corresponding to the modulator 16, to obtain a modulation signal, and output the modulation signal to the combiner 14, where as shown in FIG. 4, the spreading code received by the modulator is 1 −1 −1 1.

For example, that a modulator 16 performs, based on the spreading code and a sub-data signal that correspond to the modulator, data modulation and spread spectrum modulation on a subcarrier corresponding to the modulator, to obtain a modulation signal includes:

A data modulator in the modulator 16 performs, based on the sub-data signal corresponding to the modulator 16, data modulation on the subcarrier corresponding to the modulator 16 to obtain a data modulation signal, and then outputs the data modulation signal to a spread spectrum modulator in the modulator 16, and the spread spectrum modulator performs spread spectrum modulation on the data modulation signal based on the spreading code corresponding to the modulator 16 to obtain the modulation signal.

Alternatively, in another optional implementation, the spread spectrum modulator performs, based on the spreading code corresponding to the modulator 16, spread spectrum modulation on the subcarrier corresponding to the modulator 16 to obtain a spread spectrum modulation signal, and outputs the spread spectrum modulation signal to the data modulator, and the data modulator performs data modulation on the spread spectrum modulation signal based on the sub-data signal corresponding to the modulator 16 to obtain the modulation signal.

For example, an effect, a function, and an execution process of the modulator are technologies understood persons of ordinary skill in the art. Details are not described herein in this embodiment.

It can be understood that, in the signal transmission device in this embodiment, because a baud rate of each data signal can be reduced through multiplexing, when a bandwidth of a DAC and a bandwidth of another electronic component are fixed, a requirement of each signal on an ENOB can be reduced, so that quantization noise of the DAC and electrical noise of the another electronic component can be effectively reduced, thereby improving performance of high-level QAM.

Figure 5:
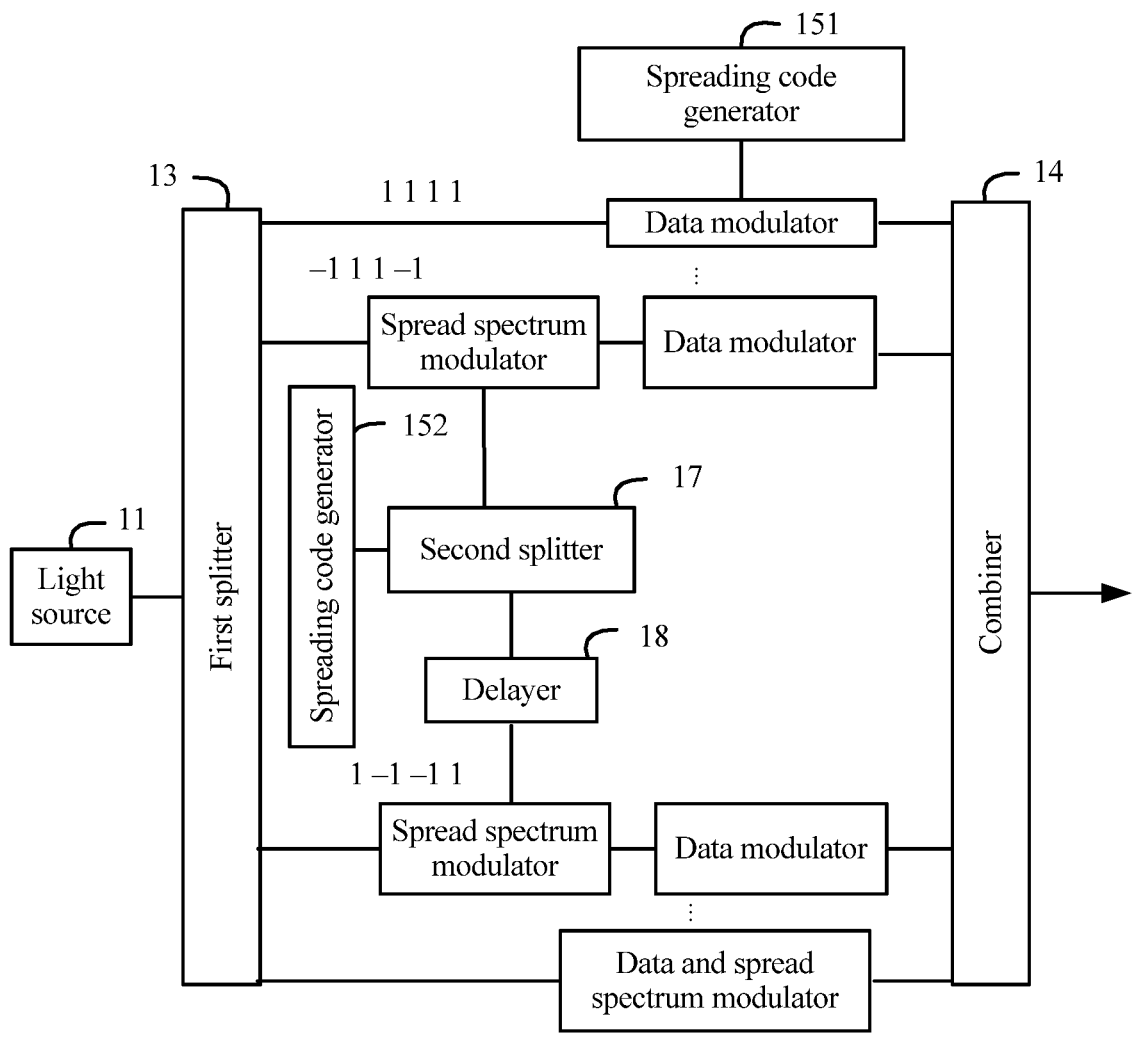
FIG. 5 is a schematic structural diagram of another implementation of a signal transmission device according to an embodiment.
Figure 6:
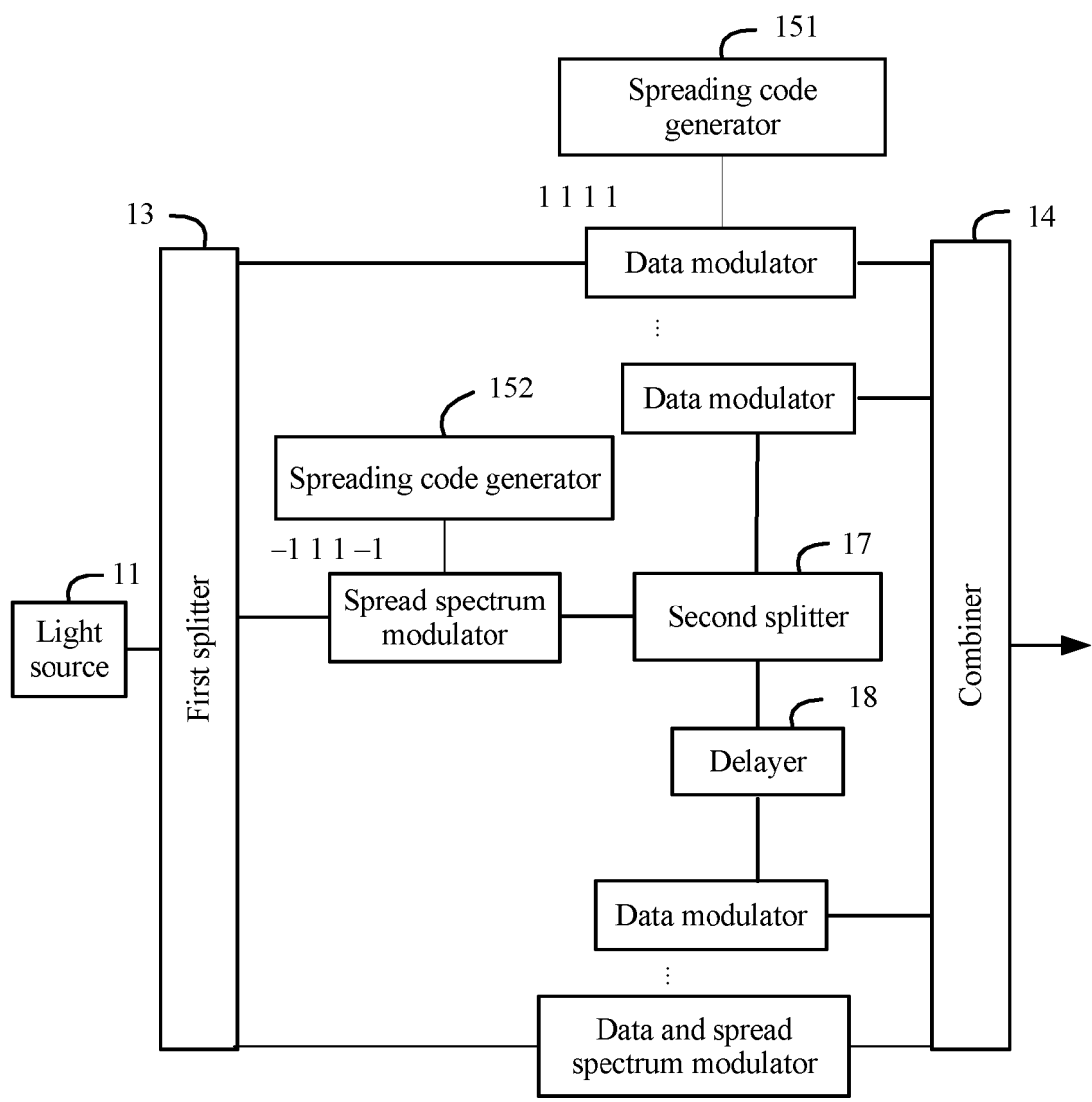
FIG. 6 is a schematic structural diagram of a third implementation of a signal transmission device according to an embodiment.
Figure 7:
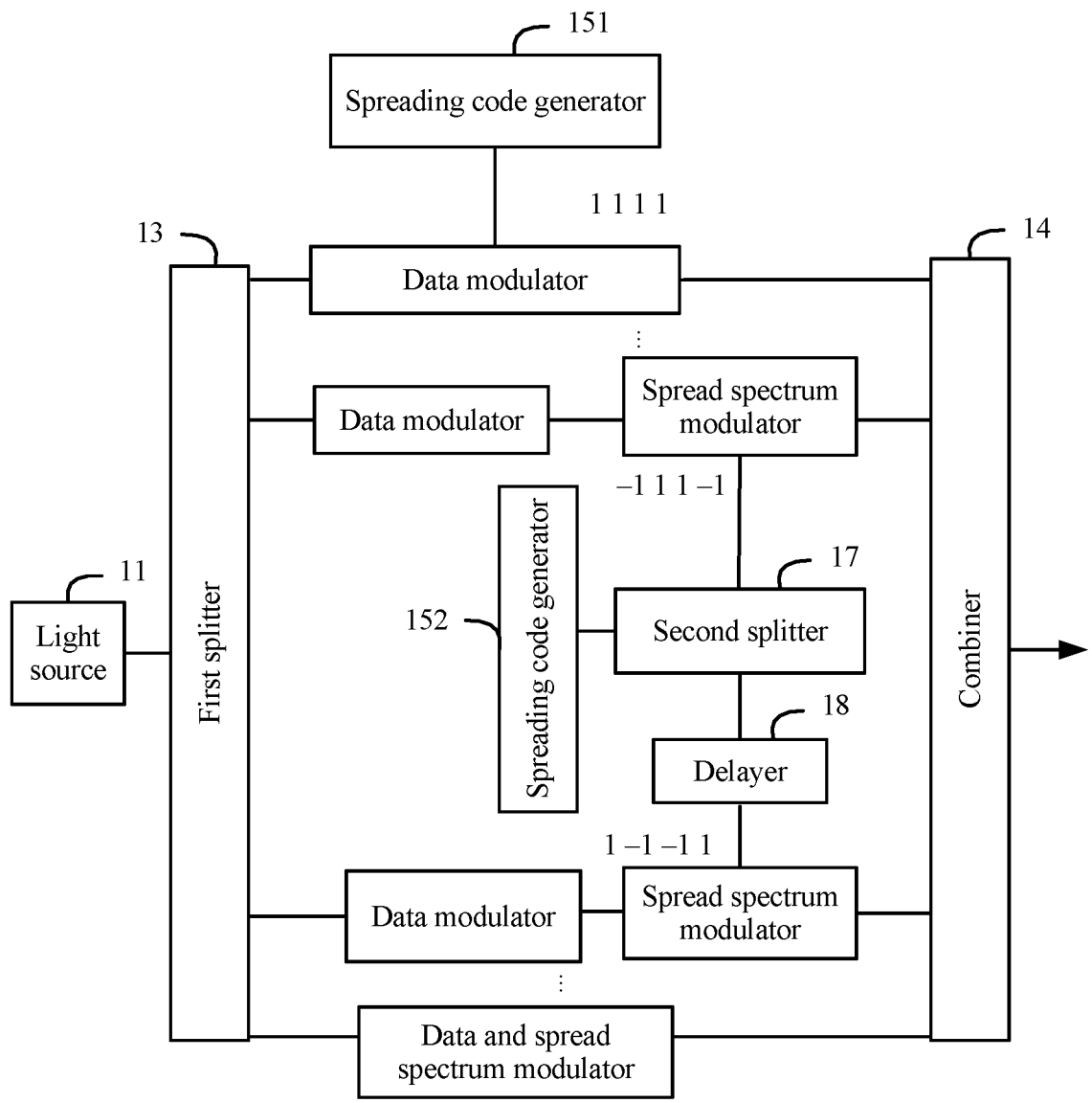
FIG. 7 is a schematic structural diagram of a fourth implementation of a signal transmission device according to an embodiment.

Based on the foregoing embodiment, embodiment 5 further provides schematic structural diagrams of signal transmission devices in different implementation scenarios. FIG. 5 to FIG. 7 are, respectively, schematic structural diagrams of the signal transmission devices in the different implementation scenarios.

As shown in FIG. 5 to FIG. 7, corresponding to the signal transmission method in embodiment 2, when a code type of a spreading code corresponding to an $n^{th}$ subcarrier is different from a code type of a spreading code of an $(n+1)^{th}$ subcarrier, an $m^{th}$ spreading code generator in the M spreading code generators 15 generates an $n^{th}$ spreading code, and inputs the $n^{th}$ spreading code to an $n^{th}$ modulator to which the $n^{th}$ subcarrier is correspondingly input; and an $(m+1)^{th}$ spreading code generator in the M spreading code generators 15 generates an $(n+1)^{th}$ spreading code, and inputs the $(n+1)^{th}$ spreading code to an $(n+1)^{th}$ modulator to which the $(n+1)^{th}$ subcarrier is correspondingly input. In other words, when the code types of the two spreading codes are different, the two different spreading code generators are configured to respectively generate the two spreading codes, and the two spreading codes are input to the respective corresponding modulators.

Correspondingly, when a code type of a spreading code corresponding to an $n^{th}$ subcarrier is the same as a code type of a spreading code of an $(n+1)^{th}$ subcarrier, an $m^{th}$ spreading code generator in the M spreading code generators 15 generates a spreading code, and inputs the spreading code to a second splitter 17; the second splitter 17 is configured to split the spreading code into two spreading codes, where one spreading code is used as an $n^{th}$ spreading code, and is input to an $n^{th}$ modulator to which the $n^{th}$ subcarrier is correspondingly input, and the other spreading code is input to a delayer 18; and the delayer 18 is configured to: delay, for t bits, the spreading code that is input by the second splitter 17 and that is obtained after the splitting, to obtain an $(n+1)^{th}$ spreading code, and input the $(n+1)^{th}$ spreading code to an $(n+1)^{th}$ modulator to which the $(n+1)^{th}$ subcarrier is correspondingly input.

It can be noted that, in this embodiment, n is a positive integer less than or equal to N−1, and m is a positive integer less than or equal to M−1.

With reference to the signal transmission method in embodiment 2, when the code type of the spreading code corresponding to the $n^{th}$ subcarrier is the same as the code type of the spreading code of the $(n+1)^{th}$ subcarrier, an implementation process of generating a spreading code and generating a modulation signal may include a number of optional implementations. Correspondingly, there are a number of signal transmission devices with different structures. FIG. 5, FIG. 6, and FIG. 7 respectively show three different signal transmission devices. To provide further exemplary explanation, the following provides detailed descriptions with reference to FIG. 5 to FIG. 7.

For example, it can be noted that, in FIG. 5 to FIG. 7, a device for transmitting a Walsh spreading code with a 4-bit length is used as an example, a first spreading code is 1 1 1 1, an $i^{th}$ spreading code is −1 1 1 −1, and an $(i+1)^{th}$ spreading code is 1 −1 −1 1. In code types of the spreading codes with a 4-bit length, a code type of the first spreading code is unique. Therefore, the code type of the first spreading code is different from a code type of another spreading code, and the first spreading code is generated by an independent spreading code generator 151. Code types of the $i^{th}$ spreading code and the $(i+1)^{th}$ spreading code are the same. Therefore, the $i^{th}$ spreading code and the $(i+1)^{th}$ spreading code are generated by using one spreading code generator 152. In addition, with reference to embodiment 4, it can be understood that a modulator receiving the first spreading code may include only a data modulator, and a modulator receiving the $i^{th}$ spreading code and the $(i+1)^{th}$ spreading code includes a data modulator and a spread spectrum modulator.

Referring to FIG. 5, in the signal transmission device shown in FIG. 5, the spreading code generator 152 generates a spreading code −1 1 1 −1, and then inputs the spreading code −1 1 1 −1 to the second splitter 17. The second splitter 17 splits the spreading code −1 1 1 −1 into two spreading codes, and then inputs one of the spreading codes to a spread spectrum modulator in an $i^{th}$ modulator. The spread spectrum modulator performs spread spectrum modulation on an $i^{th}$ subcarrier based on the spreading code −1 1 1 −1 to obtain a spread spectrum modulation signal, and inputs the spread spectrum modulation signal to a data modulator in the $i^{th}$ modulator. The data modulator performs data modulation on the spread spectrum modulation signal based on an $i^{th}$ sub-data signal to obtain an $i^{th}$ modulation signal. The second splitter 17 inputs, to the delayer 18, a second spreading code obtained after the splitting. The delayer 18 delays the spreading code −1 1 1 −1 for 1 bit to obtain the $(i+1)^{th}$ spreading code 1 −1 −1 1, and then inputs the $(i+1)^{th}$ spreading code 1 −1 −1 1 to a spread spectrum modulator in an $(i+1)^{th}$ modulator. The spread spectrum modulator performs spread spectrum modulation on an $(i+1)^{th}$ subcarrier based on the spreading code 1 −1 −1 1 to obtain a spread spectrum modulation signal, and inputs the spread spectrum modulation signal to a data modulator in the $(i+1)^{th}$ modulator. The data modulator performs data modulation on the spread spectrum modulation signal based on an $(i+1)^{th}$ sub-data signal to obtain an $(i+1)^{th}$ modulation signal.

Referring to FIG. 6, in the signal transmission device shown in FIG. 6, after generating a spreading code −1 1 1 −1, the spreading code generator 152 first inputs the spreading code −1 1 1 −1 to a spread spectrum modulator. The spread spectrum modulator performs spread spectrum modulation on a subcarrier based on the spreading code −1 1 1 −1 to obtain a spread spectrum modulation signal, and then inputs the spread spectrum modulation signal to the second splitter 17. The second splitter 17 splits the spread spectrum modulation signal into two spread spectrum modulation signals, and inputs one spread spectrum modulation signal to a data modulator in an $i^{th}$ modulator. The data modulator performs data modulation on the spread spectrum modulation signal based on an $i^{th}$ sub-data signal to obtain an $i^{th}$ modulation signal. The second splitter 17 inputs, to the delayer 18, a second spread spectrum modulation signal obtained after the splitting. The delayer 18 delays the spread spectrum modulation signal for 1 bit to obtain a spread spectrum modulation signal obtained after the delaying, and then inputs the spread spectrum modulation signal to a data modulator in an $(i+1)^{th}$ modulator. The data modulator performs data modulation on the spread spectrum modulation signal based on an $(i+1)^{th}$ sub-data signal to obtain an $(i+1)^{th}$ modulation signal.

Referring to FIG. 7, in the signal transmission device shown in FIG. 7, a data modulator in an $i^{th}$ modulator first performs data modulation on an $i^{th}$ subcarrier based on an $i^{th}$ sub-data signal to obtain an $i^{th}$ data modulation signal, and inputs the $i^{th}$ data modulation signal to a spread spectrum modulator in the $i^{th}$ modulator. Correspondingly, a data modulator in an $(i+1)^{th}$ modulator performs data modulation on an $(i+1)^{th}$ subcarrier based on an $(i+1)^{th}$ sub-data signal to obtain an $(i+1)^{th}$ data modulation signal, and inputs the $(i+1)^{th}$ data modulation signal to a spread spectrum modulator in the $(i+1)^{th}$ modulator. The spreading code generator 152 generates a spreading code −1 1 1 −1, and inputs the spreading code −1 1 1 −1 to the second splitter 17. The second splitter 17 splits the spreading code −1 1 1 −1 into two spreading codes. One spreading code is input to the $i^{th}$ spread spectrum modulator, and the other spreading code is input to the delayer 18. After the delayer delays the spreading code −1 1 1 −1 for 1 bit, a spreading code 1 −1 −1 1 is obtained and input to the $(i+1)^{th}$ spread spectrum modulator. Therefore, the $i^{th}$ spread spectrum modulator may perform spread spectrum modulation on the $i^{th}$ data modulation signal based on the spreading code −1 1 1 −1 to obtain an $i^{th}$ modulation signal, and the $(i+1)^{th}$ spread spectrum modulator may perform spread spectrum modulation on the $(i+1)^{th}$ data modulation signal based on the spreading code 1 −1 −1 1 to obtain an $(i+1)^{th}$ modulation signal.

The foregoing describes only optional implementations of this embodiment, and constitutes no limitation on technical solutions in this embodiment.

It can be understood from the description in this embodiment that, in the technical solutions in this embodiment, system performance can be improved, and device components can be reduced to a maximum extent, so that a device structure can be simplified, and costs can be reduced.

Figure 8:
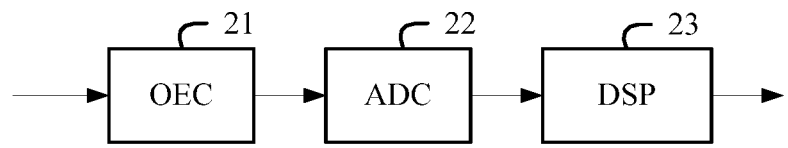
FIG. 8 is a schematic structural diagram of a signal receiving device according to an embodiment.

Corresponding to the signal receiving method in embodiment 3, embodiment 6 further provides a signal receiving device. FIG. 8 is a schematic structural diagram of the signal receiving device according to this embodiment. The signal receiving device may include an OEC 21, an ADC 22, and a DSP 23.

The OEC 21 may be configured to: receive a signal transmitted by a signal transmission device, convert the received signal into an electrical signal, and output the electrical signal to the ADC 22. The signal is obtained by the signal transmission device after the signal transmission device splits, by using a splitter, a single-wavelength optical carrier generated by a light source into N subcarriers having a same wavelength, performs data modulation and spread spectrum modulation on the N subcarriers based on N sub-data signals and N spreading codes to obtain N spread spectrum modulation signals, and combines the N spread spectrum modulation signals.

The ADC 22 may be configured to: receive the electrical signal output by the OEC 21, convert the electrical signal into a digital signal, and output the digital signal to the DSP.

The DSP 23 may be configured to: receive the digital signal output by the ADC 22, despread the digital signal based on the N spreading codes to obtain N despread signals, and perform low-pass filtering on each of the N despread signals to obtain N data signals, where N is a positive integer not less than 2.

In other words, after optical-to-electrical conversion and analog-to-digital conversion processing are performed on the received signal, to obtain the digital signal, the digital signal may be despread based on the N spreading codes used by the signal transmission device for spread spectrum modulation, so as to improve accuracy of data restoration and receiving.

It can be noted that the N spreading codes may be mutually-orthogonal bipolar binary spread spectrum sequences.

For example, each of the N spreading codes may be a real number sequence, such as a Walsh code or an OVSF code. Also, to obtain spectrums that are more evenly-distributed, each spreading code may alternatively be a sequence code or the like generated by scrambling a real number sequence such as a Walsh code or an OVSF code based on a specified pseudo-random sequence code. This is not limited in this embodiment.

Figure 9:
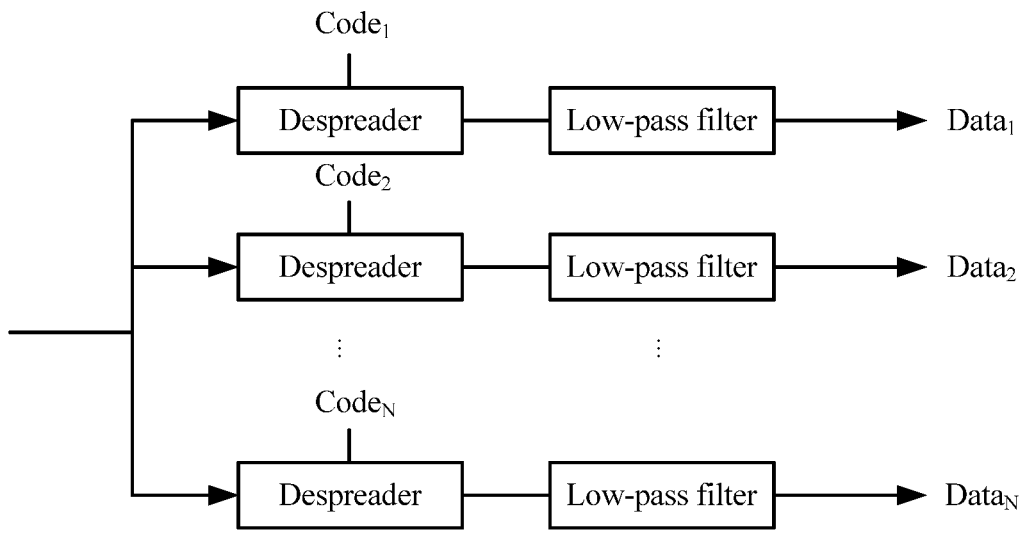
FIG. 9 is a schematic structural diagram of an implementation of a first DSP according to an embodiment.

For example, as shown in FIG. 9, the DSP 23 may include N despreaders that are in a one-to-one correspondence with the N spreading codes, and N low-pass filters (LPFs) that are in a one-to-one correspondence with the N despreaders.

Each of the N despreaders may be configured to: despread the received digital signal based on a spreading code in the N spreading codes that corresponds to the despreader to obtain a despread signal, and output the despread signal to an LPF corresponding to the despreader.

Each of the N LPFs may be configured to: receive a despread signal output by a corresponding despreader, and perform low-pass filtering on the received despread signal, to obtain a data signal.

It can be noted that the despreader may be any despreading device that can despread a spread spectrum signal, for example, a multiplier. This is not limited in this embodiment. For example, when the despreader is the multiplier, the despreader may despread the spread spectrum signal by multiplying the received digital signal by a corresponding spreading code, so as to improve accuracy of data restoration and receiving.

Figure 10:
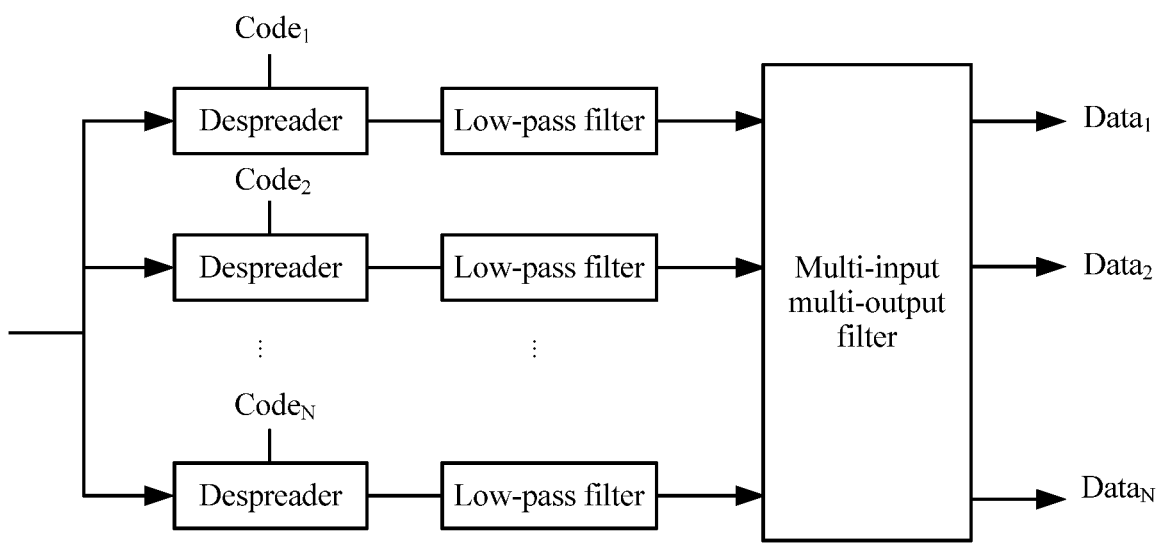
FIG. 10 is a schematic structural diagram of an implementation of a second DSP according to an embodiment.

Further, orthogonality between CDMA spreading codes may be damaged due to dispersion of a fiber link, PMD, SOP rotation, nonlinearity, and the like. Consequently, multi-access crosstalk and the like are caused. Therefore, the DSP 23 in the signal receiving device may further implement multi-access crosstalk elimination and data restoration by using an implementation structure shown in FIG. 10.

For example, the DSP may further include a multiple-input multiple-output filter.

The multiple-input multiple-output filter may be configured to perform adaptive filtering on each of the N data signals (for example, data signals output by the N LPFs), to obtain N data signals obtained after the adaptive filtering, so as to improve accuracy of data restoration and receiving.

For example, the multiple-input multiple-output filter may be any filtering device that can perform adaptive filtering on a number of input signals to eliminate multi-access crosstalk, for example, a multiple-input multiple-output finite impulse response (MIMO FIR) filter. This is not limited in this embodiment. A coefficient of the MIMO FIR filter may be obtained through calculation by using an algorithm such as a constant modulus algorithm (CMA) or an least mean square algorithm (LMS). Details are not described herein.

Figure 11:
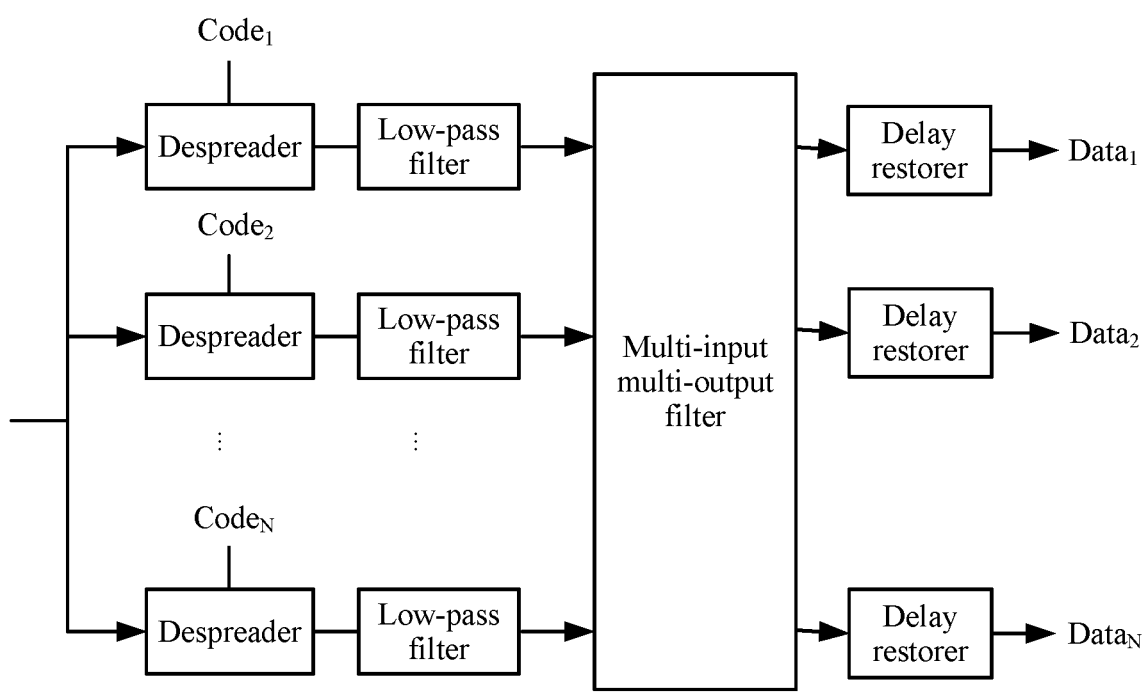
FIG. 11 is a schematic structural diagram of an implementation of a third DSP according to an embodiment.

Further, as shown in FIG. 11, the DSP may further include N delay restorers that are in a one-to-one correspondence with the N data signals obtained after the adaptive filtering.

Each of the N delay restorers may be configured to perform carrier delay restoration on a data signal that exists after the adaptive filtering and that corresponds to the delay restorer, to obtain a data signal obtained after the carrier delay restoration, so as to improve accuracy of data restoration and receiving.

Figure 12:
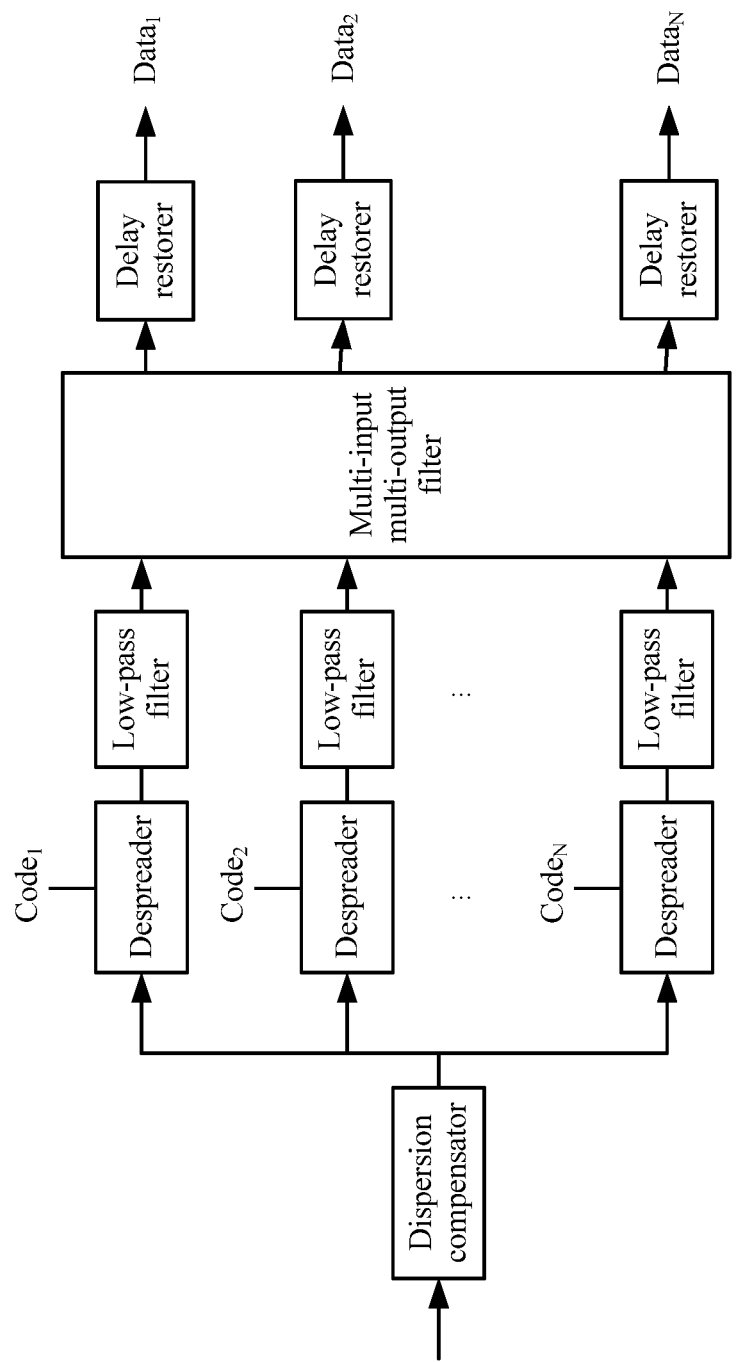
FIG. 12 is a schematic structural diagram of an implementation of a fourth DSP according to an embodiment.

Further, as shown in FIG. 12, the DSP may further include a dispersion compensator, namely, a Chromatic Dispersion Compensation (CDC).

The dispersion compensator may be configured to: before the received digital signal is despread, perform dispersion compensation on the received digital signal, and output a digital signal obtained after the dispersion compensation to the N despreaders, to eliminate impact of dispersion on the digital signal, and improve accuracy of data restoration and receiving.

Figure 13:
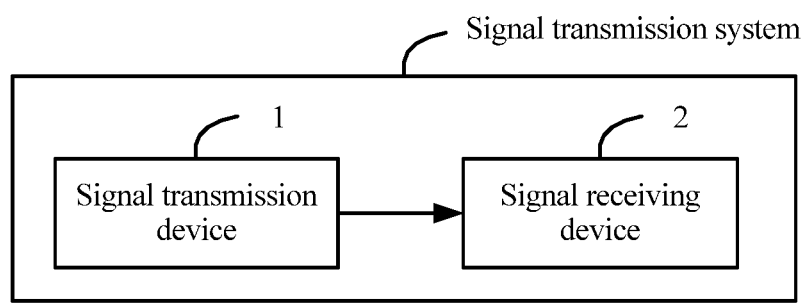
FIG. 13 is a schematic structural diagram of a signal transmission system according to an embodiment.

Based on a same invention concept as embodiment 4 to embodiment 6 (or embodiment 1 to embodiment 3), embodiment 7 provides a signal transmission system. For example, as shown in FIG. 13, the signal transmission system may include a signal transmission device 1 and a signal receiving device 2.

The signal transmission device 1 is configured to: generate a single-wavelength optical carrier; split the single-wavelength optical carrier into N subcarriers having a same wavelength; generate a spreading code corresponding to each of the subcarriers, to obtain N spreading codes, where a bandwidth of each of the spreading codes is less than or equal to a preset threshold; deserialize a to-be-transmitted data signal into N sub-data signals; modulate the N subcarriers based on the N sub-data signals and the N spreading codes, to obtain N modulation signals; and combine the N modulation signals into one combined signal, and output the combined signal, where a value of N is a positive integer not less than 2, and the N sub-data signals are in a one-to-one correspondence with the N subcarriers.

The signal receiving device 2 is configured to: receive the signal transmitted by the signal transmission device 1; perform optical-to-electrical conversion and analog-to-digital conversion processing on the received signal, to obtain a digital signal; despread the digital signal based on the N spreading codes, to obtain N despread signals; and perform low-pass filtering on each of the N despread signals, to obtain N data signals.

It can be noted that, for structures and working procedures of the signal transmission device and the signal receiving device, the related descriptions in embodiment 4 to embodiment 6 (or embodiment 1 to embodiment 3) may be referred to. Details are not described herein again.

Therefore, according to the signal transmission method, the signal receiving method, the related device, and the system in the embodiments, the generated single-wavelength optical carrier is split into the N subcarriers having the same wavelength, the spreading code corresponding to each of the subcarriers is generated to obtain the N spreading codes, the to-be-transmitted data signal is deserialized to obtain the N sub-data signals, the N subcarriers are modulated based on the N spreading codes and the N sub-data signals to obtain the N modulation signals, and then the N modulation signals are combined and output. It can be understood that, because a baud rate of each data signal can be reduced through multiplexing, when a bandwidth of a DAC and a bandwidth of another electronic component are fixed, a requirement of each signal on an ENOB can be reduced, so that impact caused by quantization noise of the DAC and electrical noise of the another electronic component can be effectively reduced, thereby improving performance of high-level QAM.

Although some embodiments have been described, persons of ordinary skill in the art can make other changes and modifications to these embodiments once they learn the basic inventive concept. Persons of ordinary skill in the art can make various modifications and variations to the embodiments without departing from their spirit and scope. In this way, the invention is intended to cover these modifications and variations.

What is claimed is:

1. A signal transmission method, comprising:
generating a single-wavelength optical carrier;
splitting the single-wavelength optical carrier into N subcarriers having a same wavelength, wherein a value of N is a positive integer not less than 2;
generating a spreading code corresponding to each of the subcarriers to obtain N spreading codes, wherein a bandwidth of each of the spreading codes is less than or equal to a preset threshold;
deserializing a to-be-transmitted data signal into N sub-data signals, wherein the N sub-data signals are in a one-to-one correspondence with the N subcarriers;
modulating the N subcarriers based on the N sub-data signals and the N spreading codes, to obtain N modulation signals; and
combining the N modulation signals into one combined signal, and outputting the combined signal.

2. The signal transmission method according to claim 1, wherein the generating of the spreading code corresponding to each of the subcarriers to obtain N spreading codes comprises:
when a code type of a spreading code corresponding to an $n^{th}$ subcarrier is different from a code type of a spreading code of an $(n+1)^{th}$ subcarrier, triggering an $m^{th}$ spreading code generator to generate the spreading code corresponding to the $n^{th}$ subcarrier, and triggering an $(m+1)^{th}$ spreading code generator to generate the spreading code corresponding to the $(n+1)^{th}$ subcarrier, wherein n is a positive integer less than or equal to N−1, and m is a positive integer less than or equal to N−1.

3. The signal transmission method according to claim 1, wherein the generating of the spreading code corresponding to each of the subcarriers to obtain N spreading codes comprises:
when a code type of a spreading code corresponding to an $n^{th}$ subcarrier is the same as a code type of a spreading code of an $(n+1)^{th}$ subcarrier, triggering an $m^{th}$ spreading code generator to generate the spreading code corresponding to the $n^{th}$ subcarrier, and delaying, for t bits, the spreading code corresponding to the $n^{th}$ subcarrier, to obtain the spreading code of the $(n+1)^{th}$ subcarrier, wherein n is a positive integer less than or equal to N−1, and m is a positive integer less than N−1.

4. The signal transmission method according to claim 1, wherein the modulating of the N subcarriers based on the N sub-data signals and the N spreading codes to obtain N modulation signals comprises:
when all bits of a spreading code corresponding to the subcarrier are the same, performing data modulation on the subcarrier based on a sub-data signal corresponding to the subcarrier to obtain a modulation signal; or
when not all bits of a spreading code corresponding to the subcarrier are the same, performing data modulation and spread spectrum modulation on the subcarrier based on the spreading code and a sub-data signal corresponding to the subcarrier to obtain a modulation signal.

5. The signal transmission method according to claim 4, wherein the performing of data modulation and spread spectrum modulation on the subcarrier based on the spreading code and a sub-data signal corresponding to the subcarrier to obtain a modulation signal comprises:
performing data modulation on the subcarrier based on the sub-data signal to obtain a data modulation signal; and performing spread spectrum modulation on the data modulation signal based on the spreading code, to obtain the modulation signal; or
performing spread spectrum modulation on the subcarrier based on the spreading code, to obtain a spread spectrum signal; and performing data modulation on the spread spectrum signal based on the sub-data signal, to obtain the modulation signal.

6. A signal transmission device, comprising: a light source, a deserializer, a first splitter, a combiner, M spreading code generators, and N modulators, wherein a value of N is a positive integer not less than 2, and M is a positive integer less than or equal to N, wherein
the light source is configured to generate a single-wavelength optical carrier;
the deserializer is configured to: deserialize a to-be-transmitted data signal into N sub-data signals, and output the N sub-data signals to the N modulators, wherein the N sub-data signals are in a one-to-one correspondence with the N modulators;
the first splitter is configured to: split the single-wavelength optical carrier generated by the light source into N subcarriers having a same wavelength, and output the N subcarriers to the N modulators, wherein the N subcarriers are in a one-to-one correspondence with the N modulators;
each of the M spreading code generators is configured to generate a spreading code corresponding to each subcarrier obtained by the first splitter through the splitting, to obtain N spreading codes, wherein a bandwidth of a spreading code generated by each of the M spreading code generators is less than or equal to a preset threshold;
each of the N modulators is configured to: modulate, based on a sub-data signal corresponding to the modulator, and a spreading code in the N spreading codes that corresponds to the modulator, a subcarrier corresponding to the modulator, to obtain a modulation signal corresponding to the modulator, and output the modulation signal to the combiner; and
the combiner is configured to: combine N modulation signals received from the N modulators into one combined signal, and output the combined signal.

7. The signal transmission device according to claim 6, wherein when a code type of a spreading code corresponding to an $n^{th}$ subcarrier is different from a code type of a spreading code of an $(n+1)^{th}$ subcarrier,
an $m^{th}$ spreading code generator in the M spreading code generators generates an $n^{th}$ spreading code, and inputs the $n^{th}$ spreading code to an $n^{th}$ modulator to which the $n^{th}$ subcarrier is correspondingly input; and
an $(m+1)^{th}$ spreading code generator in the M spreading code generators generates an $(n+1)^{th}$ spreading code, and inputs the $(n+1)^{th}$ spreading code to an $(n+1)^{th}$ modulator to which the $(n+1)^{th}$ subcarrier is correspondingly input, wherein n is a positive integer less than or equal to N−1, and m is a positive integer less than or equal to M−1.

8. The signal transmission device according to claim 6, wherein when a code type of a spreading code corresponding to an $n^{th}$ subcarrier is the same as a code type of a spreading code of an $(n+1)^{th}$ subcarrier,
an $m^{th}$ spreading code generator in the M spreading code generators generates a spreading code, and inputs the spreading code to a second splitter;
the second splitter is configured to split the spreading code into two spreading codes, wherein one spreading code is used as an $n^{th}$ spreading code, and is input to an $n^{th}$ modulator to which the $n^{th}$ subcarrier is correspondingly input, and the other spreading code is input to a delayer; and
the delayer is configured to: delay, for t bits, the spreading code that is input by the second splitter and that is obtained after the splitting, to obtain an $(n+1)^{th}$ spreading code, and input the $(n+1)^{th}$ spreading code to an $(n+1)^{th}$ modulator to which the $(n+1)^{th}$ subcarrier is correspondingly input, wherein
n is a positive integer less than or equal to N−1, and m is a positive integer less than or equal to M−1.

9. The signal transmission device according to claim 6, wherein the N modulators comprise:
a modulator receiving a spreading code whose bits are all the same, configured to: perform, based on a sub-data signal corresponding to the modulator, data modulation on a subcarrier corresponding to the modulator to obtain a modulation signal, and output the modulation signal to the combiner; or
a modulator receiving a spreading code whose bits are not all the same, configured to: perform, based on the spreading code and a sub-data signal that correspond to the modulator, data modulation and spread spectrum modulation on a subcarrier corresponding to the modulator, to obtain a modulation signal, and output the modulation signal to the combiner.

10. The signal transmission device according to claim 9, wherein a modulator in the N modulators performs, based on the spreading code and a sub-data signal that correspond to the modulator, data modulation and spread spectrum modulation on a subcarrier corresponding to the modulator, to obtain a modulation signal comprising:
performing, by a data modulator in the modulator based on the sub-data signal corresponding to the modulator, data modulation on the subcarrier corresponding to the modulator to obtain a data modulation signal, and outputting the data modulation signal to a spread spectrum modulator in the modulator; and performing, by the spread spectrum modulator, spread spectrum modulation on the data modulation signal based on the spreading code corresponding to the modulator, to obtain the modulation signal; or
performing, by a spread spectrum modulator based on the spreading code corresponding to the modulator, spread spectrum modulation on the subcarrier corresponding to the modulator to obtain a spread spectrum modulation signal, and outputting the spread spectrum modulation signal to a data modulator; and performing, by the data modulator, data modulation on the spread spectrum modulation signal based on the sub-data signal corresponding to the modulator, to obtain the modulation signal.

* * * * *